United States Patent
Lin et al.

(10) Patent No.: US 10,147,417 B2
(45) Date of Patent: Dec. 4, 2018

(54) ELECTRONIC SPEECH RECOGNITION NAME DIRECTORY PROGNOSTICATION SYSTEM BY COMPARING A SPOKEN NAME'S PACKETIZED VOICE TO STORED PHONEMES

(71) Applicant: Avaya Inc., Santa Clara, CA (US)

(72) Inventors: Lin Lin, Belleville (CA); Ping Lin, Belleville (CA)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 15/284,035

(22) Filed: Oct. 3, 2016

(65) Prior Publication Data

US 2018/0096679 A1    Apr. 5, 2018

(51) Int. Cl.
| | |
|---|---|
| *G10L 15/00* | (2013.01) |
| *G10L 15/06* | (2013.01) |
| *G10L 13/00* | (2006.01) |
| *G10L 15/01* | (2013.01) |
| *G10L 25/51* | (2013.01) |
| *G10L 15/26* | (2006.01) |
| *G10L 15/22* | (2006.01) |

(52) U.S. Cl.
CPC .............. *G10L 15/01* (2013.01); *G10L 25/51* (2013.01); *G10L 15/00* (2013.01); *G10L 15/22* (2013.01); *G10L 15/265* (2013.01)

(58) Field of Classification Search
CPC ......... G10L 15/00; G10L 15/08; G10L 15/22; G10L 15/265; G10L 15/19
USPC ................................ 704/239, 235, 236, 243
See application file for complete search history.

(56) References Cited

U.S. PATENT DOCUMENTS

| | | | |
|---|---|---|---|
| 6,078,885 A | 6/2000 | Beutnagel | |
| 6,260,012 B1* | 7/2001 | Park | G10L 15/08 |
| | | | 379/88.03 |
| 6,397,182 B1 | 5/2002 | Cruickshank | |
| 9,818,401 B2* | 11/2017 | Printz | G10L 15/19 |

(Continued)

OTHER PUBLICATIONS

"Managing Voice-Recognition Features in Cisco Unity 8.x," Cisco, 2014, retrieved from https://web.archive.org/web/20140718181452/http://www.cisco.com/c/en/us/td/docs/voice_ip_comm/unity/8x/administration/guide/8xcusagx/8xcusag165.html, 5 pages.

(Continued)

*Primary Examiner* — Farzad Kazeminezhad
(74) *Attorney, Agent, or Firm* — Sheridan Ross P.C.

(57) ABSTRACT

A speech recognizer performs speech recognition on a spoken name supplied by a user, producing a list of possible matches and corresponding confidence scores, by comparing a packetized voice stream of a spoken name to a plurality of stored phonemes that represent users' text names. If the top scoring match for a spoken name does not correctly identify the spoken name or if the spoken name's confidence score is below a first threshold, the user name is flagged to the system administrator as having a potential speech recognition problem. The results of the speech recognition are used to suggest names whose spelling may need to be adjusted to resolve the speech recognition problem. During production, a low threshold for rejecting speech recognition results can be adjusted downwards for names that produced low scores during testing. Heuristics are presented for re-testing only a subset of names when the set of names is changed.

20 Claims, 5 Drawing Sheets

(56) References Cited

U.S. PATENT DOCUMENTS

| | | | |
|---|---|---|---|
| 2003/0114202 A1* | 6/2003 | Suh | H04M 1/271 455/569.2 |
| 2006/0143007 A1* | 6/2006 | Koh | G10L 15/22 704/243 |
| 2011/0022386 A1 | 1/2011 | Gatzke et al. | |

OTHER PUBLICATIONS

"Understanding Automatic Speech Recognition Directory Lookups," Microsoft, 2010, retrieved from https://technet.microsoft.com/en-us/library/aa996927(v=exchg.141).aspx, 10 pages.

* cited by examiner

FIG. 4

ELECTRONIC SPEECH RECOGNITION NAME DIRECTORY PROGNOSTICATION SYSTEM BY COMPARING A SPOKEN NAME'S PACKETIZED VOICE TO STORED PHONEMES

BACKGROUND

Electronic speech recognition is sometimes used to enter names in auto attendants and when addressing messages. For example, a user may want to send an email to a specific user or make a voice call to a specific user. In this case, the user can use an electronic voice interface to say to whom the email or voice call is being addressed. A common problem in electronic speech processing is that that some names are not properly recognized at all or are not recognized with sufficient confidence by current speech recognition processors. This lack of proper recognition may result in increased customer escalations and dissatisfaction because the electronic speech recognition process cannot properly associate the spoken name to a specific user.

SUMMARY

These and other needs are addressed by the various embodiments and configurations of the present disclosure. The ability to recognize names from a given set of names using a speech recognizer is tested using recordings of each name as spoken by its owner. After the recognizer processes a spoken name, it produces a list of names that are potential matches. Each potential match has a confidence score; this allows the list to be ordered. If the actual name corresponding to a spoken name does not appear at the top of the list or has a confidence score lower than a given high threshold, it is flagged as a potential recognition problem to the system administrator, who may then alter the spelling of the name given to the recognizer so that it may generate a better matching transcription. It is useful to show the administrator all the names on the list; sometimes the administrator has to adjust the spelling of names other than the one under test.

It is useful to be able to re-test the entire set of spoken names whenever a change is made to the set of names to be recognized; a name that was previously recognized with high confidence might now fall below the threshold. If the number of names is large, the retesting could be expensive or time consuming. To limit the scope of the re-test, one could test the spoken name corresponding to the added/changed name, and then recognize each name that appears on the resulting list of potential matches. A complementary strategy is to save the list of potential matches when each spoken name is tested; when a name is changed or deleted, only the spoken name whose saved list contains the name is re-tested.

During regular operation, if a name is recognized with a confidence score below a given low threshold, the result is considered too unreliable to be even worth confirming with the user. However, if the spoken name is recognized with low confidence during testing, the low score is saved and used in place of the standard low threshold during regular operation.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6.

Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
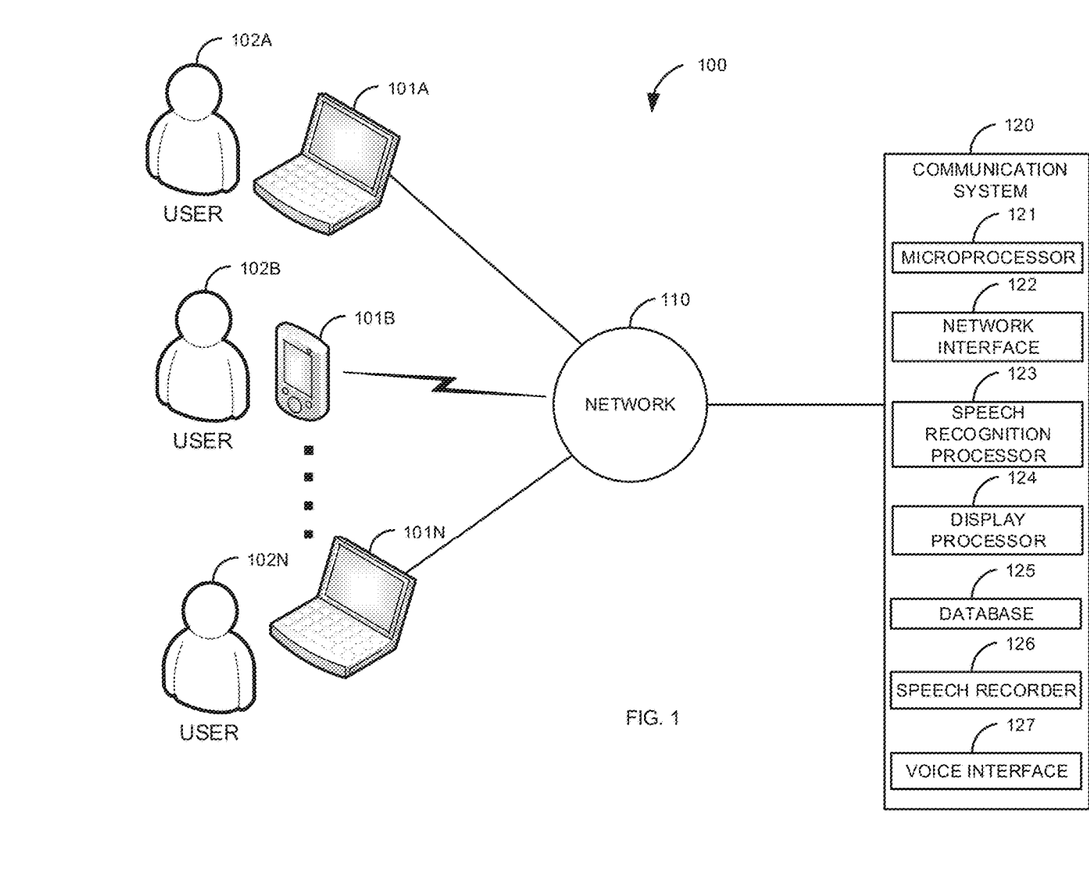
FIG. 1 is a block diagram of a first illustrative system for electronic speech recognition for name directories.

FIG. 1 is a block diagram of a first illustrative system 100 for electronic speech recognition for name directories. The first illustrative system 100 comprises communication endpoints 101A-101N, a network 110, and a communication system 120.

The communication endpoints 101A-101N can be or may include any communication endpoint device that can communicate on the network 110, such as a Personal Computer (PC), a telephone, a video system, a cellular telephone, a Personal Digital Assistant (PDA), a tablet device, a notebook device, a smart phone, and the like. The communication endpoints 101A-101N are devices where a communication sessions ends. The communication endpoints 101A-101N are not network elements that facilitate and/or relay a communication session in the network, such as a communication manager or router. As shown in FIG. 1, any number of communication endpoints 101A-101N may be connected to the network 110.

FIG. 1 also shows users 102A-102N. The user 102 is a person who is a user of an individual communication endpoint 101.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and/or the like. The network 110 can use a variety of electronic protocols, such as Ethernet, Internet Protocol (IP), Session Initiation Protocol (SIP), Integrated Services Digital Network (ISDN), video protocols, email protocols, Instant Messaging (IM) protocols, and/or the like. Thus, the network 110 is an electronic communication network configured to carry messages and communications via packets and/or circuit switched communications.

The communication system 120 comprises a microprocessor 121, a network interface 122, a speech recognition processor 123, a display processor 124, a database 125, a speech recorder 126, and a voice interface 127. The communication system 120 may comprise various types of communication systems, such as a Private Branch Exchange (PBX), a central office switch, a server, a video conferencing system, an audio conferencing system, a Back-to-Back user agent in a server or PBX, a proxy server, a front end processor, and/or the like.

The microprocessor 121 can be or may include any hardware processor that can be used to process information, such as an application specific processor, a micro-controller, a multi-core processor, a Digital Signaling Processor (DSP), a video processor, and/or the like. The network interface 122 can be any hardware coupled with software that can communicate on the network 110, such as an Ethernet interface, a wired interface, a wireless interface, an 802.11 interface, an optical interface, a modem, a cellular interface, and/or the like.

The speech recognition processor 123 can be or may include hardware coupled with software that can electronically analyze users 102 speech. The speech recognition processor 123 can use a variety of known algorithms to recognize speech. The speech recognition processor 123 can be used to recognize speech in various languages and/or dialects.

The display processor 124 can be or may include hardware coupled with software that can generate information for display, such as a web server, a video card, an audio card, and/or the like.

The database 125 can be or may include any database 125 for storing information in a memory or disk, such as a relational database, a file system, a directory service, a hierarchical database, and/or the like.

The speech recorder 126 can be or may include any hardware coupled with software that can record a user's 102 speech. For example, the speech recorder 126 can be used to record a user's 102 name that is stored in the database 125.

The voice interface 127 can be or may include hardware coupled with software that can receive voice input from a user 102. For example, the voice interface 127 may receive packetized voice from the communication endpoints 101A-101N. The voice interface 127 may include hardware on the communication endpoint 101.

In FIG. 1, the elements 121-127 are shown separate from the communication endpoints 101A-101N. However, in some embodiments some or all the elements (e.g., elements 121-127) may be implemented in the communication endpoints 101A-101N. For example, the speech recognition processor 123, the display processor 124, and the voice interface 127 may be implemented in the communication endpoints 101A-101N. Alternatively, different elements (e.g. elements 121-127) may be distributed between the communication system 120 and the communication endpoints 101A-101N. In some embodiments some of the elements 121-127 may be implemented in the communication system 120 while other elements may be implemented in the communication endpoints 101A-101N.

Figure 2:
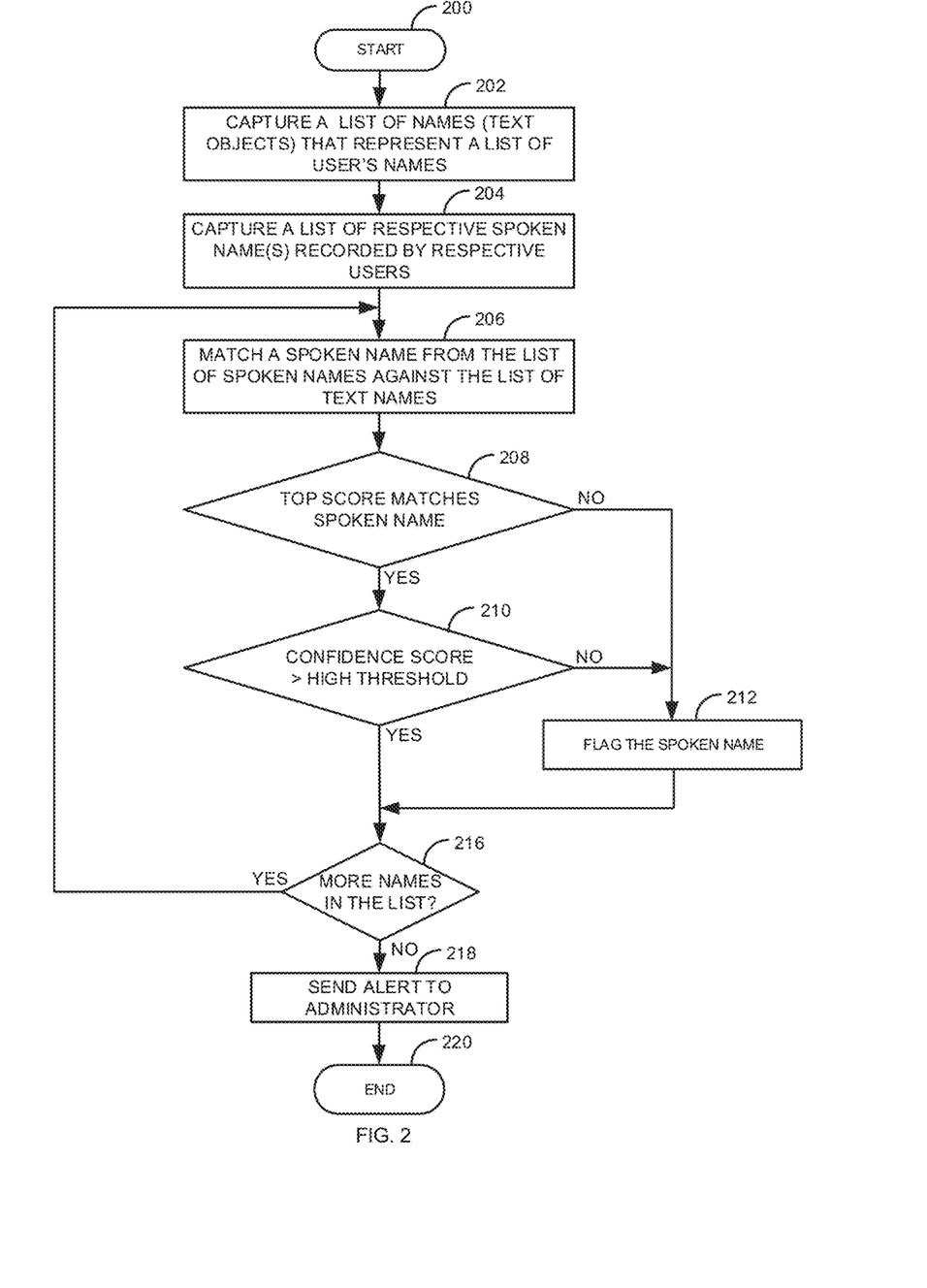
FIG. 2 is a flow diagram of a process for detecting user names that are likely to have electronic speech recognition problems.

FIG. 2 is a flow diagram of a process for detecting user names that are likely to have electronic speech recognition problems. Illustratively, the communication endpoints 101A-101N, the network 110, the communication system 120, the network interface 122, the speech recognition processor 123, the display processor 124, the database 125, the speech recorder 126, and the voice interface 127 are stored-program-controlled entities, such as a computer or microprocessor, which performs the method of FIGS. 2-5 and the processes described herein by executing program instructions stored in a computer readable storage medium, such as a memory or disk. Although the methods described in FIGS. 2-5 are shown in a specific order, one of skill in the art would recognize that the steps in FIGS. 2-5 may be implemented in different orders and/or be implemented in a multi-threaded environment. Moreover, various steps may be omitted or added based on implementation.

The process starts in step 200. The speech recognition processor 123 captures a list of names that represent a list of user's names in step 202. The list of names is a list of text objects that represent the users (e.g., the users 102A-102N). For example, the list of names may be a corporate directory, a directory for a group of people, group within an organization, a list of names from a phone list, an email list, and/or the like. The list of names may comprise a single name for a single user 102. The list of names may comprise a single name or multiple names for an individual user 102. For example a user 102 may have a maiden name and a married name that are in the list of names.

Capturing the list of names may comprise receiving the list of names via the network interface 122, or receiving the list of names from a user interface at the communication system 120 or via a communication endpoint 101. For example, an administrator may enter the list of names via a web server on the communication system 120. The list of names may be captured in a document and then extracted from the document. The speech recognition processor 123 may capture the list of names from the database 125.

The speech recognition processor 123 captures a list of respective spoken names recorded by the respective users 102 in step 204. The respective spoken names may be recorded by the users 102 via the speech recorder 126. The respective spoken names may be based on the user's names that are recorded by a voicemail system or via an alternative recording system. The speech recognition processor 123 may capture the list of spoken names from the database 125. The recorded names are from the respective user 102 saying their own name.

The speech recognition processor 123 attempts to match spoken name SN from user U against the list of text names in step 206, producing an ordered list recog(SN) of potential matches and confidence scores of the form $\{(N_1,S_1), (N_2,S_2), (S_3,N_3) \ldots \}$, $S_1>=S_2>=S_3$. $S_i$ is a measure of the likelihood that SN is text name $N_i$. Recog(SN) is saved as test(U). recog( ) represents the recognizer's processing of a waveform; test( ) looks up a stored result given a text name. For example, if the list of names had ten text names, the speech recognition processor 123 determines, based on the waveform of the spoken name, if any of the text names are a likely match. This is done by comparing portions of the waveform of the spoken name with phonemes of the spoken name to see if they match. As more of the spoken name is compared, additional phonemes of the text names are compared to the waveform of the spoken name. A phoneme is a portion of a sound. For example, the letter "a" may have several phonemes that are used to recognize when a user speaks the letter "a" versus the letter "b." Each phoneme is mapped into a hidden Markov model. Because the way a phoneme is pronounced varies with context (e.g., a language or dialect), one of several Markov models may be used. The name becomes a sequence of hidden Markov models. The phonemes allow the speech recognition processor 123 to determine confidence scores based on how the spoken name matches phonemes for the text names. For example, if the there were two user names (Lin and Lynn), the phonemes for the "i" in Lin and the "y" in Lynn would produce different confidence scores for a user speaking the name Lin. Those text names that are an unlikely match are dropped. The output of step 206 is one or more confidence scores (if any) that are likely a match. Similarly, if the list of names included the name John Smith and John Smithe (pronounced John Smith), the spoken name of John Smith (spoken by John Smithe) would produce a high confidence score for the name John Smith, but would produce a low confidence score for the name John Smithe even though the two names are pronounced the same. This is because the name Smithe is phonetically pronounce different from Smith.

Figure 5:
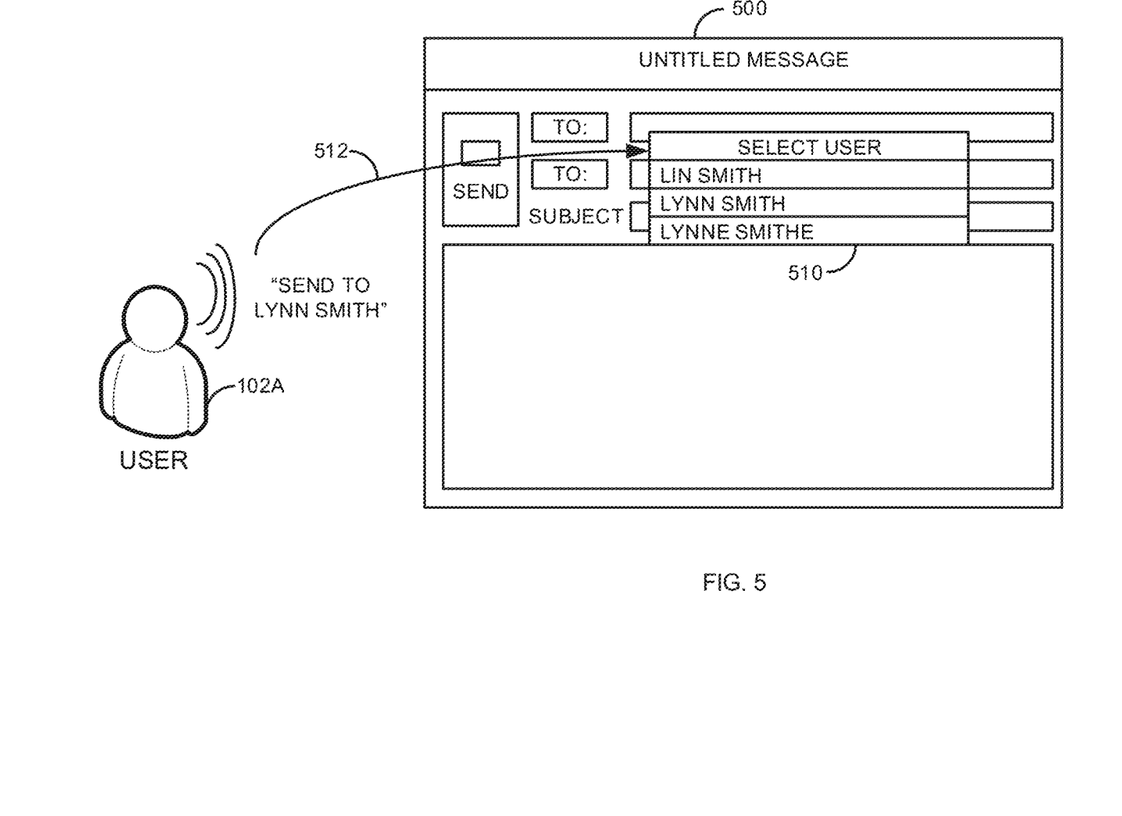
FIG. 5 is a diagram of a user interface that displays potential users for an email system based on an electronic speech recognition process.

Alternatively, if the user 102 has a heavy accent or the name is from one language (e.g., India) and the speech recognition processor 123 uses names in a different language (e.g., English), the confidence score may be low. Similar problems can occur when there are multiple users 102 that have the same name. For example, there may be two John Smith's in the list of names. The user 102 may be trying to reach a different John Smith than what is displayed to the user 102 via the display processor 124 (e.g., as shown in FIG. 5). The confidence score may be low where the user 102 goes by a different name (e.g., Jim Black instead of James Black). In this case, a user 102 may say "Jim Black" when the user's name in the list of names is actually James Black, which results in a low calculated confidence score.

Higher confidence scores reflect a better fit between spoken and text names. Confidence scores are affected by competing hypotheses; for example, if there are two text names that both match very well, they might each score 0.5 as opposed to 1.0 when there is only one. If a text name scores above a high threshold $T_H$ (e.g., 0.7) the match is considered sufficiently good as to not require confirmation with the user. The confidence score is typically used as part of the voice interface 127 that allows a user 102 to speak a user's name instead of typing the user's name. For example, a user 102A may want to send an email to another user 102B, send a text message to the other user 102B, establish an Instant Messaging (IM) session with the other user 102B, make a voice call to the other user 102B, make a video call to the other user 102B, and/or the like. The voice interface 127 allows the user 102 to establish the communication vocally.

The speech recognition processor 123 checks that the top scoring result $N_1$ in recog(SN) correctly identifies the user U that produced SN, and that $S_1>=T_H$. If this is not the case, U is reported to the system administrator as having a potential recognition problem in step 212. Recog(SN) shall be included as part of the report. For example, the user John Smithe might supply a spoken name SN that sounds like "John Smith. Recog(SN) might turn out to be {("John Smith", 0.75), ("John Smithe", 0.25)} in step 208. $N_1$="John Smith" does not correctly identify the user and thus he is reported in step 212. Examining recog(SN), it can be surmised that "John Smithe" probably generated a pronunciation closer to Smithe.

If a second user, John Smith, obtains a similar recog(SN) of {("John Smith", 0.75), ("John Smithe", 0.25)}, $N_1$ correctly identifies him and $S_1>T_H=0.7$. He will not be reported and the process proceeds to step 216. A third user, Lin, might obtain a recog(SN) of {("Lin", 0.5), ("Lynn", 0.5)}. Although $N_1$ correctly identifies him, $S_1<T_H$, and he is reported. Examining recog(SN), it can be deduced that "Lin" and "Lynn" probably produced the same pronunciation, and surnames need to be added to disambiguate.

In step 216, the speech recognition processor 123 determines if there are more spoken names to be tested. If there are more names, the speech recognition processor 123 goes to step 206 to test the next one. Otherwise, if there are not any more names in step 216, the process may optionally send an alert to an administrator if any of the names have been flagged in step 218. This allows an administrator to look at the names that have problem confidence scores and make possible changes to the names (e.g., those identified in steps 212 and 214). One possible action may be to change the spelling of the name as discussed in FIG. 4. The process then ends in step 220.

Figure 3:
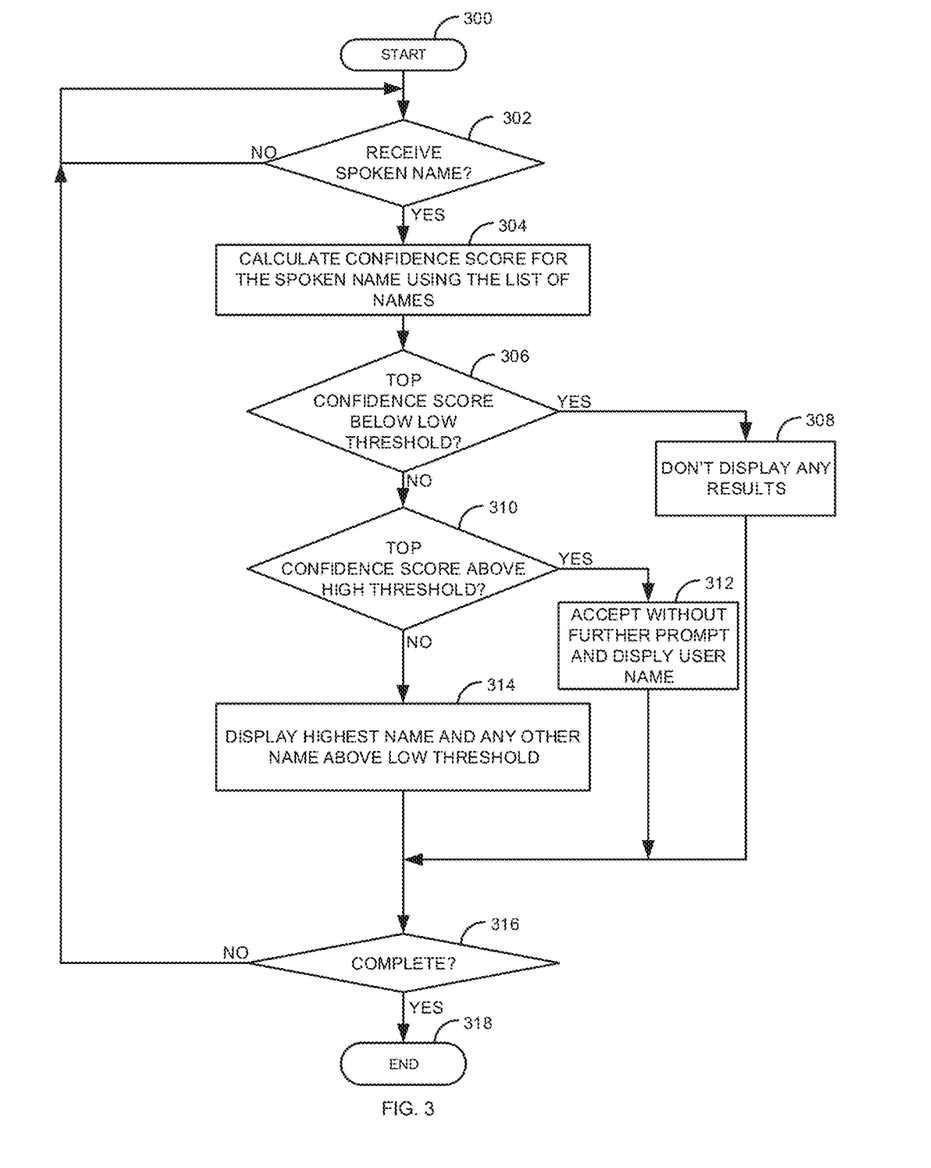
FIG. 3 is a flow diagram of a process for analyzing spoken names as part of an electronic speech recognition process.
Figure 4:
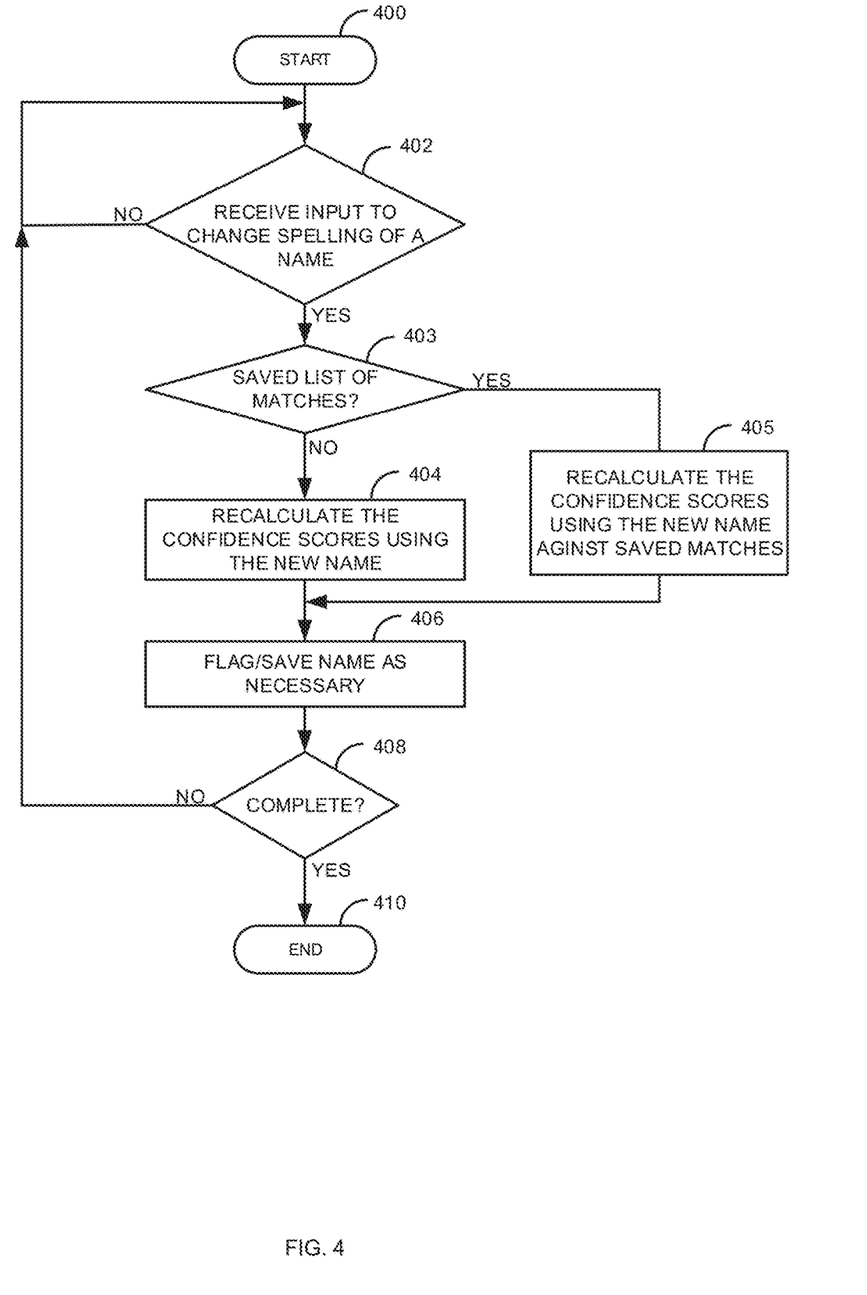
FIG. 4 is a flow diagram of a process for adjusting names to achieve better confidence scores.

FIG. 3 is a flow diagram of a process for analyzing spoken names as part of an electronic speech recognition process. The process starts in step 300. The process waits to receive a spoken name SN from the voice interface 127 in step 302. For example, the process waits to receive voice input to identify a user 102 to send an email to in step 302. If a received spoken name is not received in step 302, the process repeats step 302. Otherwise, if the spoken name is received in step 302, the speech recognition processor 123 calculates recog(SN)={$(N_1,S_1)$, $(N_2,S_2)$, $(N_3,S_3)$ ... }, $S_1>=S_2>=S_3$ using the list of names in step 304. For example, if there are ten names in the list, the speech recognition processor 123 will calculate a confidence score for the spoken name as described in step 208 where the spoken name is compared to phonemes (hidden Markov models) for the names in the list of names.

By default, if a confidence score falls below a low threshold $T_L$ (e.g., 0.5), the match is considered to be too poor to use. If the highest confidence score $S_1<T_L$ in step 306, the display processor 124 does not generate for display (to a user), in step 308, any of the names from recog(SN). The process then goes to step 316.

If test($N_1$) is available from step 206, it might contain a confidence score S for $N_1$. If $S<T_L$, it could be used instead of $T_L$, i.e., reject if $S_1<S$. In other words, one can make allowances for names that score low during testing.

Confidence scores above a high threshold $T_H$ (e.g., 0.7) are considered to indicate an excellent match. If the highest confidence score $S_1>T_H$, $N_1$ is accepted and displayed as the user name in step 312. The process then goes to step 316. Otherwise, the user may be prompted to select one of the $N_1$ for which $T_L<S_i<T_H$ in step 314.

The speech recognition processor 123 determines in step 316 if the process is complete. If the process is not complete in step 316, the process goes back to step 302 to wait for a spoken name. Otherwise, the process ends in step 318.

Whenever a change is made to the set of text names, it is possible that some existing spoken name may develop a recognition problem. If the number of names is large, it is expensive to re-test all spoken names. By examining test(U) from step 206, there are a number of strategies to identify a subset of spoken names to re-test.

One could re-test only spoken names that were not identified by the top match or scored lower than $T_H$.

When a name N with spoken name SN is added, one could re-test all names in recog(SN) other than N.

When a name N is deleted or changed, one could re-test all names M whose test(M) contain N.

When a name N with spoken name SN is re-tested, one could recursively apply paragraph 47 to all names in recog (SN) that have not been re-tested.

FIG. 5 is a diagram of a user interface that displays potential users 102 for an email system based on an electronic speech recognition process. FIG. 5 comprises a user 102A, an email message 500, and a user selection window 510. The process of FIG. 5 is based on the process of FIGS. 2-4. Although the process of FIG. 5 is based on an email, the process can work for other applications that use names as input for the application.

Using the voice interface 127, the user 102A wants to send an email to the user 102 Lynn Smith." Via the voice interface 127 the user 102A says "send to Lynn Smith." in step 512. As a result of the processes in FIG. 2-4, the user selection window 510 is displayed to the user 102A. The user selection window 510 displays three possible users 102 whose names are above the high threshold: 1) Lin Smith, 2) Lynn Smith, and 3) Lynne Smithe. For example, process of FIG. 4 may have been used to change the name of Lynne Smithe to Lin Smith (based on it being flagged steps 212 or 214). Even though the name (i.e., the text) has been changed from Lynne Smithe to Lin Smith, in the list of names (using the process of FIG. 4), the user selection window 510 shows the actual spelling for Lynne Smithe to the user 102A. This allows the user 102A to then select the appropriate user 102 in the user selection window 510 to send the email message to.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device (s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising: a microprocessor; and
 a computer readable medium, coupled with the microprocessor and comprising microprocessor readable and executable instructions that program the microprocessor to:
 capture a list of text names that represent a plurality of user's names;
 receive, from a communication endpoint, via a network, a packetized voice stream of a spoken name received from a user of the plurality of users;
 perform a test recognition on the spoken name against the list of text names to produce a list of possible matches and corresponding confidence scores, wherein the test recognition on the spoken name compares the packetized voice stream of the spoken name to a plurality of portions of electronically stored sound representations comprising phonemes that represent the plurality of user's text names in the list of text names;
 determine whether a top match correctly identifies the spoken name and the top match's confidence score exceeds a selected first threshold; and
 in response to determining that the top match does not correctly identify the spoken name or that the top match's confidence score does not exceed the selected first threshold, flag the spoken name as having a recognition problem.

2. The system of claim 1, wherein the microprocessor readable and executable instructions further program the microprocessor to:
 receive a new spoken name;
 determine a confidence score for the new spoken name using the list of text names; and
 determining, if a top confidence score for the new spoken name is one of:
  a top confidence score that is above the selected first threshold;
  below a selected second threshold;
  not a top confidence score that is above the selected first threshold; or
  is below the selected first threshold, but above the selected second threshold.

3. The system of claim 2, wherein a confidence score for the new spoken name is not a top confidence score in the list of possible matches, but is above the selected first threshold and wherein the microprocessor readable and executable instructions further program the microprocessor to generate for display, all text names whose confidence scores are above the selected first threshold.

4. The system of claim 2, wherein a confidence score for the new spoken name is below the selected first threshold, but above the selected second threshold and wherein the microprocessor readable and executable instructions further program the microprocessor to generate for display, a top name associated with the new spoken name and text names whose confidence scores are below a confidence score associated with the top name for the new spoken name, but above the selected second threshold.

5. The system of claim 2, wherein a confidence score for the new spoken name is used for an input in one of an email system, a text messaging system, an Instant Messaging (IM) system, a telephone, or a video phone.

6. The system of claim 2, wherein the second selected threshold is a name-dependent threshold obtained from testing a user's spoken name.

7. The system of claim 1, wherein the microprocessor readable and executable instructions further program the microprocessor to re-test a subset of the list of text names when a spelling of a name in the list of text names is changed, a new name is added to the list of text names, or an existing name is deleted from the list of text names.

8. The system of claim 7, wherein names that were not correctly identified by the top match or scored below the first threshold when previously tested are recursively re-tested.

9. The system of claim 7, wherein other names that appear as possible matches for the added new name are re-tested.

10. The system of claim 7, wherein names for which the deleted existing name was a possible match when previously tested are re-tested.

11. The system of claim 1, wherein the microprocessor readable and executable instructions further program the microprocessor to display a set of text names to examine when a name is flagged as having a speech recognition problem.

12. The system of claim 11, where the speech recognition problem is a same user name with a different pronunciation.

13. A method comprising:
 capturing, by a microprocessor, a list of text names that represent a plurality of user's names;
 receiving, by the microprocessor, from a communication endpoint via a network a packetized voice stream of a spoken name received from a user of the plurality of users;
 perform, by the microprocessor, a test recognition on the spoken name against the list of text names to produce a list of possible matches and corresponding confidence scores, wherein the test recognition on the spoken name compares the packetized voice stream of the spoken name to a plurality of portions of electronically stored sound representations comprising a plurality of phonemes that represent the plurality of user's text names in the list of text names;
 determining, by the microprocessor, whether a top match correctly identifies the spoken name and the top match's confidence score exceeds a selected first threshold; and
 in response to determining that the top match does not correctly identify the spoken name or that the top match's confidence score does not exceed the selected first threshold, flagging, by the microprocessor, the spoken name as having a recognition problem.

14. The method of claim 13, further comprising:
 receiving, by the microprocessor, a new spoken name;
 determining, by the microprocessor, a confidence score for the new spoken name using the list of text names; and
 determining, by the microprocessor, if a top confidence score for the new spoken name is one of:
  a top confidence score that is above the selected first threshold;
  below a selected second threshold;
  not a top confidence score that is above the selected first threshold; or is below the selected first threshold, but above the selected second threshold.

15. The method of claim 14, wherein a confidence score for the new spoken name is not a top confidence score in the list of possible matches, but is above the selected first threshold and further comprising: generating for display, by the microprocessor, all text names whose confidence scores are above the selected first threshold.

16. The method of claim 14, wherein a confidence score for the new spoken name is below the selected first threshold, but above the selected second threshold and further comprising: generating for display, by the microprocessor, a top name associated with the new spoken name and text names whose confidence scores are below a confidence score associated with the top name for the new spoken name, but above the selected second threshold.

17. The method of claim 14, wherein a confidence score for the new spoken name is used for an input in one of an email system, a text messaging system, an Instant Messaging (IM) system, a telephone, or a video phone.

18. The method of claim 13, further comprising:
re-testing, by the microprocessor, a subset of the list of text names when a spelling of a name in the list of text names is changed, a new name is added to the list of text names, or an existing name is deleted from the list of text names.

19. The method of claim 18, wherein names that were not correctly identified by the top match or scored below the first threshold when previously tested are recursively re-tested.

20. The method of claim 18, wherein names for which the deleted existing name that are a possible match when previously tested are re-tested.

\* \* \* \* \*